United States Patent
Powers et al.

(10) Patent No.: US 8,376,747 B2
(45) Date of Patent: Feb. 19, 2013

(54) ASSISTED LEARNING DEVICE

(75) Inventors: Robert B. Powers, Ortonville, MI (US);
Charles A. Massoll, Milford, MI (US);
Mark J. Person, Clarkston, MI (US);
Rodney A. Gooden, Rochester Hills, MI (US);
Vivian T. Williams, Oakland Township, MI (US); Joel D. Lutz, Auburn Hills, MI (US); David E. Bojanowski, Clarkston, MI (US); Irwin J. Karwick, Brighton, MI (US)

(73) Assignee: GM Global Technology Operations LLC

( * ) Notice: Subject to any disclaimer, the term of this patent is extended or adjusted under 35 U.S.C. 154(b) by 985 days.

(21) Appl. No.: 11/411,339

(22) Filed: Apr. 26, 2006

(65) Prior Publication Data
US 2006/0286543 A1 Dec. 21, 2006

Related U.S. Application Data

(60) Provisional application No. 60/685,085, filed on May 26, 2005.

(51) Int. Cl.
*G09B 9/04* (2006.01)
*G06F 17/00* (2006.01)

(52) U.S. Cl. ............................................. 434/62; 701/1
(58) Field of Classification Search ................... 434/62; 701/1
See application file for complete search history.

(56) References Cited

U.S. PATENT DOCUMENTS

| | | | | |
|---|---|---|---|---|
| 5,602,982 A * | 2/1997 | Judd et al. | ...................... | 715/709 |
| 5,845,160 A * | 12/1998 | Patton | ........................... | 396/312 |
| 6,389,332 B1 * | 5/2002 | Hess et al. | ........................ | 701/1 |
| 6,922,616 B2 * | 7/2005 | Obradovich et al. | ............. | 701/1 |
| 6,922,730 B1 * | 7/2005 | Yaple | ........................... | 709/231 |
| 2003/0113702 A1 * | 6/2003 | Matumoto et al. | ............ | 434/365 |
| 2004/0019591 A1 * | 1/2004 | Gardner | ........................... | 707/3 |
| 2004/0233045 A1 * | 11/2004 | Mays | ........................ | 340/425.5 |

* cited by examiner

*Primary Examiner* — Xuan Thai
*Assistant Examiner* — Jerry-Daryl Fletcher

(57) ABSTRACT

An assisted learning (AL) system for a vehicle including vehicle systems with input devices is provided. The AL system includes: memory that stores usage instructions for the input devices; an AL input device; an audio output device; and a control module that retrieves a respective one of the usage instructions associated with a selected one of the input devices when the selected one of the input devices is actuated after the AL input device is actuated and that outputs the usage instructions to the audio output device.

11 Claims, 2 Drawing Sheets

ASSISTED LEARNING DEVICE

CROSS-REFERENCE TO RELATED APPLICATIONS

This application claims the benefit of U.S. Provisional Application No. 60/685,085, filed on May 26, 2005. The disclosure of the above application is incorporated herein by reference.

FIELD

The present disclosure relates to vehicle control systems, and more particularly to audible vehicle assistance for user inputs to vehicle control systems.

BACKGROUND

The statements in this section merely provide background information related to the present disclosure and may not constitute prior art.

Vehicle systems have many different types of user controls such as buttons, knobs, sliders, touch screens, etc. that are used to control functions of the associated vehicle system. Owner's manuals typically provide printed instructions of the vehicle's systems and controls. While some user controls may be easy to understand, the function and use of other user controls may not be as readily apparent.

If a user does not know how to operate the system or control, there are a few ways to learn how the system or control works. The user may attempt to operate the system or control by adjusting the control without instructions. This method has both positive and negative effects. The user may achieve the end result, but may not understand or retain how it was achieved. If the user wants to operate the system or control again, there is a likelihood that the same "guessing game" will take place. If the system does not perform its function, the user can become frustrated and hesitate to use the system or control. The user may also attempt to look up the instructions in the owner's manual. If a question arises while driving alone, the user may need to stop the vehicle and read the owner's manual.

SUMMARY OF THE INVENTION

Accordingly, an assisted learning (AL) system for a vehicle including vehicle systems with input devices is provided. The AL system includes: memory that stores usage instructions for the input devices; an AL input device; an audio output device; and a control module that retrieves a respective one of the usage instructions associated with a selected one of the input devices when the selected one of the input devices is actuated after the AL input device is actuated and that outputs the usage instructions to the audio output device.

In other features, a method of providing assisted learning (AL) for a vehicle including input devices is provided. The method includes: receiving an AL system activation request; outputting a beginning voice prompt; receiving a function activated notification related to a function control; deactivating said function control relating to said function activated notification; and outputting instructions relating to said function control.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
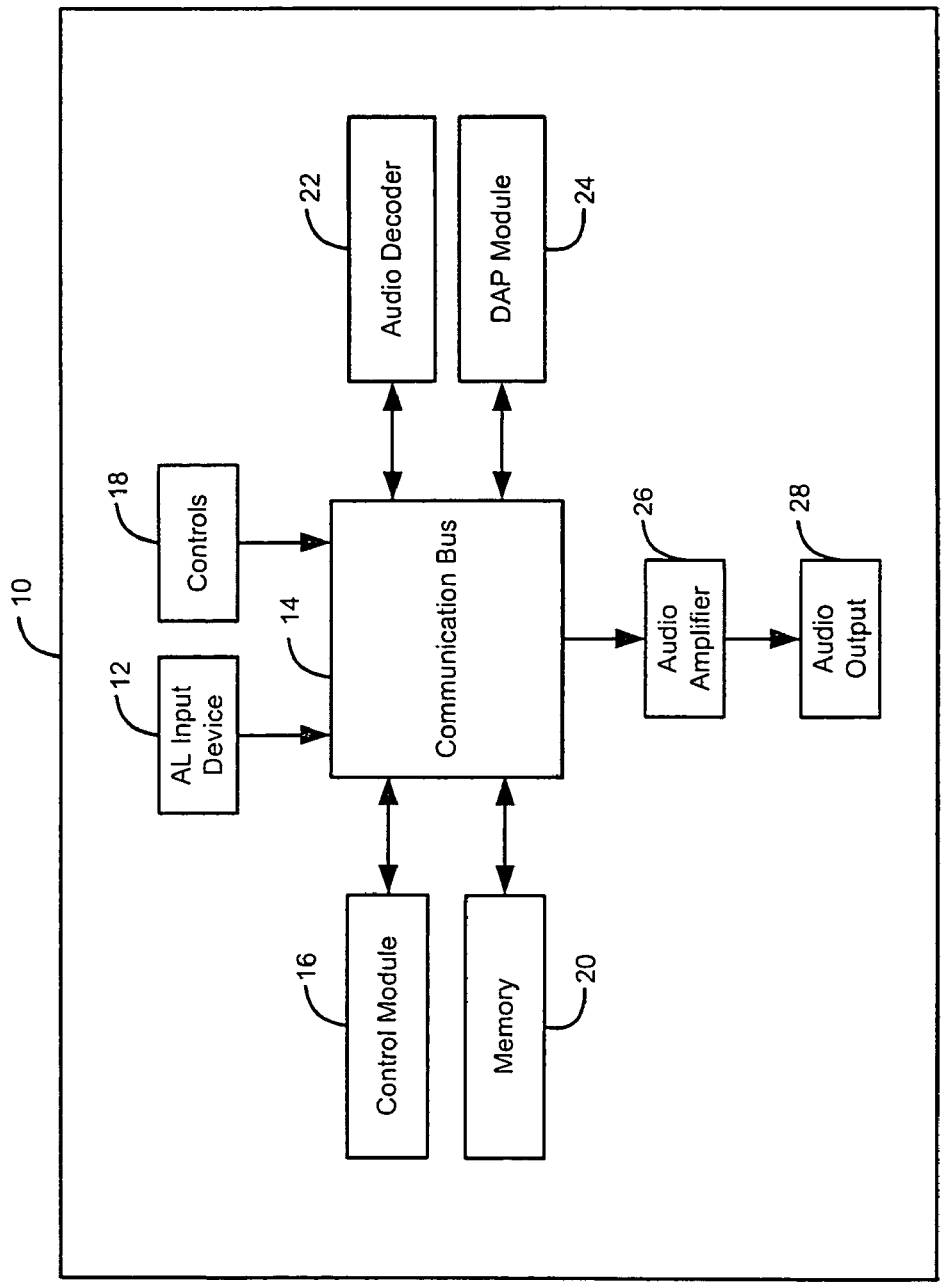
FIG. 1 is a functional block diagram of a vehicle including an Assisted Learning (AL) system.

The following description is merely exemplary in nature and is in no way intended to limit the present disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring to FIG. 1, an assisted learning (AL) system 10 according to the present invention will be described in detail. The AL system 10 provides audio instructions of a vehicle's systems and/or controls. An AL input device 12 enables and/or disables an AL mode and may include a button, knob, switch, or any other suitable device. A communication bus 14 allows the flow of data between inputs and outputs of the AL system 10.

The vehicle includes other controls 18 that are used to actuate various vehicle systems. Exemplary controls 18 that are associated with vehicle systems may include buttons, knobs, sliders, keypads, etc., that are associated with radio, CD, DVD, seats, doors, navigation, etc. A control module 16 performs control and processing related to the operation of the AL system 10 as will be described below. Memory 20 stores the instructions associated with the vehicle systems. The memory 20 may include both volatile and non-volatile memory. In some implementations, the memory 20 stores the instructions in a compressed format, e.g., MP3.

In order to play back audio from a compressed format, an audio decoder 22 converts the compressed files into uncompressed digital audio files. The uncompressed digital audio files are then played by a digital audio playback (DAP) module 24, which converts the digital signals to audio signals. An audio amplifier 26 boosts the strength of the audio signal. The audio amplifier 26 supplies the audio signal to an audio output 28. The audio output 28 allows a user to hear the audio signal output. An exemplary audio output 28 may include a speaker.

Once the user actuates the AL input device 12, the control module 16, through the audio port 28, outputs a voice prompt. For example, the voice prompt may be "Welcome. You have entered Assisted Learning mode. Please press any button or operate any control which you would like assistance. Press the Assisted Learning button again to cancel this mode." While a specific prompt is described herein, skilled artisans will appreciate that other prompts may be used.

For example, the user may depress a radio preset button. In response thereto, an exemplary control 18 prompt may be, "This is a radio preset button. It provides a fast easy method to tune to a favorite radio station. First tune to a station you like. Then press and hold this preset button for two seconds until a beep is heard. You have just saved that radio station to a preset. Now any time you want to return to this station, momentarily press the radio preset again. Up to 30 favorite stations can be programmed. Assisted Learning Ended. (Beep)."

In some embodiments, the DAP module 24 may be implemented into a vehicle's radio. Because the radio already has interfaces to an audio amplifier, no additional vehicle wiring or packaging would be required. However, the DAP module 24 could be located in another vehicle module or could be a stand-alone module.

Figure 2:
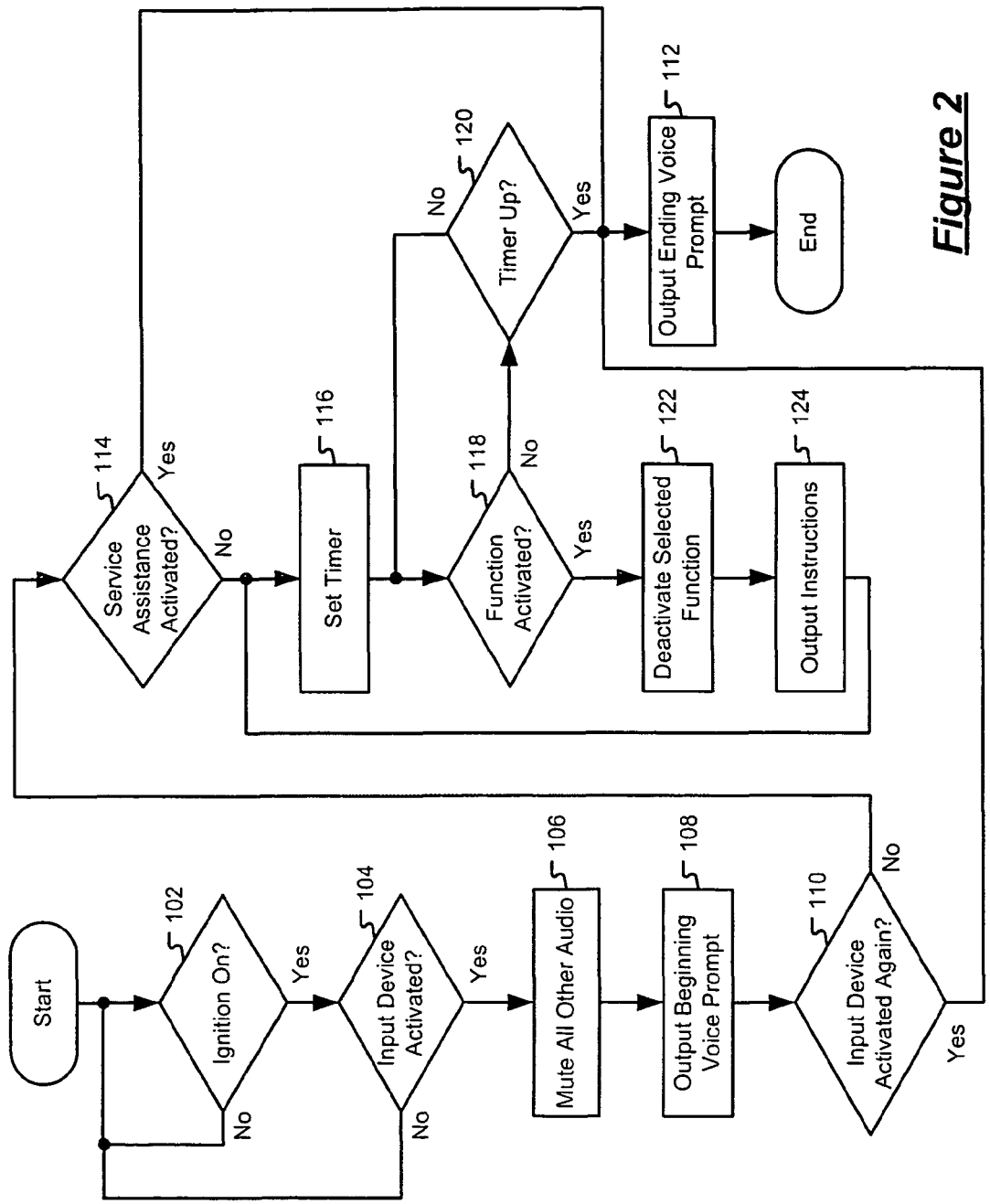
FIG. 2 is a flowchart illustrating a method performed by the AL system.

Referring now to FIG. 2, the AL system will be described in further detail. Control determines whether the ignition is on at 102. If the ignition is not on, control returns to evaluate the ignition at 102. If the ignition is on, control determines whether the input device of the AL system is activated at 104. If the input device of the AL system is not activated, control returns to evaluate the ignition at 102.

If the input device of the AL system is activated, control mutes all other radio output at 106. Control outputs the beginning voice prompt at 108. Control determines whether the enable of the AL system is activated again at 110. If the enable of the AL system is activated again, control outputs the ending voice prompt at 112. If the enable of the AL system is not activated again, control determines whether service assistance, e.g. OnStar®, is activated at 114. If the service assistance is activated, control outputs the ending voice prompt at 112.

If the service assistance is not activated, control sets a timer at 116. Control determines whether a function is activated at 118. If a function is not activated, control determines whether the timer is up at 120. If the timer is not up, control returns to determine whether a function is activated at 118. If the timer is up, control outputs ending voice prompt at 112. If a function is activated, control deactivates the selected function control at 122. Control outputs the instructions at 124 and proceeds to set the timer at 116.

Those skilled in the art can now appreciate from the foregoing description that the broad teachings of the present disclosure can be implemented in a variety of forms. Therefore, while this disclosure has been described in connection with particular examples thereof, the true scope of the present disclosure should not be so limited since other modifications will become apparent to the skilled practitioner upon a study of the drawings, specification, and the following claims.

What is claimed is:

1. An assisted learning system for a vehicle, comprising:
a plurality of vehicle systems that each include one or more input devices;
memory that stores usage instructions for each of the input devices;
an assisted learning (AL) input device;
an audio output device; and
a control module that:
(i) in response to user actuation of the AL input device, mutes other audio input devices;
(ii) in response to user actuation of one of the input devices within a predetermined period after the user actuation of the AL input device:
(a) retrieves the usage instructions for the one of the input devices; and
(b) deactivates functionality of the one of the input devices;
(iii) outputs the usage instructions for the one of the input devices to the audio output device; and
(iv) in response to a second user actuation of the AL input device within a predetermined period after the user actuation of the AL input device, ends the output of the usage instructions for the one of the input devices.

2. The assisted learning system of claim 1 wherein the audio output device is a speaker and the usage instructions include audio files that are output by the speaker.

3. The assisted learning system of claim 1, wherein the usage instructions are stored in the memory as compressed digital audio files, and the assisted learning system further comprises an audio decoder that converts the compressed digital audio files into decompressed digital audio signals.

4. The assisted learning system of claim 3 further comprising a digital audio playback (DAP) module that receives the decompressed digital audio signals from the audio decoder and that converts the decompressed digital audio signals to analog audio signals.

5. The assisted learning system of claim 1 wherein, in response to the user actuation of the AL input device, the control module further outputs an assisted learning prompt to the audio output device.

6. The assisted learning system of claim 1 wherein, in response to user activation of a remote service assistance system, the control module ends the usage instructions.

7. A method of operating an assisted learning system for a vehicle the method comprising:
storing usage instructions for each input device of the vehicle, the vehicle including an assisted learning (AL) input device and including a plurality of vehicle systems each having one or more input devices;
in response to user actuation of the AL input device, muting other audio input devices;
in response to user actuation of one of the input devices within a predetermined period after the user actuation of the AL input device:
(a) retrieving the usage instructions for the one of the input devices; and
(b) deactivating functionality of the one of the input devices;
outputting the usage instructions for the one of the input devices to an audio output device; and
in response to a second user actuation of the AL input device within a predetermined period after the user actuation of the AL input device, ending the output of the usage instructions for the one of the input devices.

8. The method of claim 7 further comprising:
storing the usage instructions in memory as compressed digital audio files; and
converting the compressed digital audio files into decompressed digital audio signals.

9. The method of claim 8 further comprising:
receiving the decompressed digital audio signals;
converting the decompressed digital audio signals to analog audio signals; and
outputting the analog audio signals to the audio output device.

10. The method of claim 7 further comprising, in response to the user actuation of the AL input device, outputting an assisted learning prompt to the audio output device.

11. The method of claim 7 further comprising, in response to user activation of a remote service assistance system, ending the usage instructions.

* * * * *